United States Patent [19]

Catino et al.

[11] Patent Number: 5,319,780
[45] Date of Patent: Jun. 7, 1994

[54] SYSTEM THAT IMPLICITLY LOCKS A SUBTREE OR EXPLICITLY LOCKS A NODE BASED UPON WHETHER OR NOT AN EXPLICIT LOCK REQUEST IS ISSUED

[75] Inventors: Robert J. Catino, Binghamton, N.Y.; Tom K. Chan, Thornhill, Canada

[73] Assignee: International Business Machines Corporation, Armonk, N.Y.

[21] Appl. No.: 58,994

[22] Filed: May 3, 1993

Related U.S. Application Data

[63] Continuation of Ser. No. 819,598, Jan. 9, 1992, abandoned, which is a continuation of Ser. No. 547,417, Jul. 3, 1990, abandoned, which is a continuation of Ser. No. 110,362, Oct. 19, 1987, abandoned.

[51] Int. Cl.5 .................... G06F 12/08; G06F 12/16
[52] U.S. Cl. .................... 395/600; 395/725; 395/700; 364/246.6; 364/246.8; 364/283.2; 364/251.6; 364/DIG. 1
[58] Field of Search ............. 395/600, 725, 650, 425, 395/700

[56] References Cited

U.S. PATENT DOCUMENTS

| 4,017,840 | 4/1977 | Schild et al. | 364/200 |
|---|---|---|---|
| 4,135,240 | 1/1979 | Ritchie | 364/200 |
| 4,249,241 | 2/1981 | Aberle et al. | 364/200 |
| 4,399,504 | 8/1983 | Obermarck et al. | 364/200 |
| 4,408,273 | 10/1983 | Plow | 395/600 |
| 4,432,057 | 2/1984 | Daniell et al. | 395/725 |
| 4,480,304 | 10/1984 | Carr et al. | 395/725 |
| 4,498,145 | 2/1985 | Baker et al. | 395/600 |
| 4,506,326 | 3/1985 | Shaw et al. | 395/700 |
| 4,507,751 | 3/1985 | Gawlich et al. | 395/575 |
| 4,641,274 | 2/1987 | Swank | 395/200 |
| 4,663,709 | 5/1987 | Fujiwara et al. | 364/200 |
| 4,709,326 | 11/1987 | Robinson | 364/200 |
| 4,780,821 | 10/1988 | Crossley | 364/200 |
| 4,791,554 | 12/1988 | Hiroto et al. | 364/200 |
| 4,819,159 | 4/1989 | Shipley et al. | 371/9 |
| 4,847,754 | 7/1989 | Obermarck et al. | 364/200 |

OTHER PUBLICATIONS

J. N. Gray, "Notes on Data Base Operating Systems", *Operating Systems*, R. Bayer (Editor), pp. 437–445, 1977.
Computer Design, 24(1985) Jul., No. 8, "Operating System Aimed At PCs Smooths Networking".

*Primary Examiner*—Thomas C. Lee
*Assistant Examiner*—Larry J. Ellcessor
*Attorney, Agent, or Firm*—Arthur J. Samodovitz; John S. Sensny

[57] ABSTRACT

A multi-user system for managing a database, and comprising a file access processor and a plurality of application support processors. The file access processor is provided to access the database, and the support processors are connected to the file access processor to read and update data objects in the database. The file access processor includes a locking system to lock data objects for selected support processors to limit access to locked data objects by the other support processors. This locking system includes an implicit locking subsystem to place implicit locks on data objects automatically in response to receiving processing requests from the support processors, and an explicit locking subsystem to place explicit locks on data objects in response to receiving explicit locking requests from the support processors. The explicit locks are integrated into the locking scheme in a manner minimizing lock conflicts.

11 Claims, 3 Drawing Sheets

|    | ES | EU | EX | IS | IX | S | SIX | X |
|----|----|----|----|----|----|---|-----|---|
| ES | Y  | N  | N  | Y  | N  | Y | N   | N |
| EU | N  | N  | N  | Y  | N  | Y | N   | N |
| EX | N  | N  | N  | N  | N  | N | N   | N |
| IS | Y  | Y  | N  | Y  | Y  | Y | Y   | N |
| IX | N  | N  | N  | Y  | Y  | N | N   | N |
| S  | Y  | Y  | N  | Y  | N  | Y | N   | N |
| SIX| N  | N  | N  | Y  | N  | N | N   | N |
| X  | N  | N  | N  | N  | N  | N | N   | N |

Explicit Modes
ES – Explicit Share
EU – Explicit Update
EX – Explicit Exclusive

Implicit Modes
IS – Intent Share
IX – Intent Exclusive
S – Share
SIX – Share with Intent Exclusive
X – Exclusive

SYSTEM THAT IMPLICITLY LOCKS A SUBTREE OR EXPLICITLY LOCKS A NODE BASED UPON WHETHER OR NOT AN EXPLICIT LOCK REQUEST IS ISSUED

This application is a continuation of application Ser. No. 07/819,598, filed on Jan. 9, 1992 now abandoned, which is a continuation of application Ser. No. 07/547,417, filed on Jul. 3, 1990 now abandoned, which is a continuation of application Ser. No. 07/110,362, filed Oct. 19, 1987 now abandoned.

BACKGROUND OF THE INVENTION

This invention generally relates to multi-user systems for managing databases, and more particularly, to such systems having locking protocols.

Locking protocols are employed in multi-user environments to control access to shared data objects. To elaborate, a multi-user database managing system may include a file access processor and a plurality of application support processors. The file access processor provides access to a database, and the application support processors are connected to the file access processor to transmit inquires to and to receive responses from the file access processor. For example, a user at a support processor may add data to, delete data from, or change data in records or files stored in the database. Often, several users at different support processors may concurrently access the same data in the database —a condition referred to as concurrency. Under such circumstances, it is usually desirable to control access to the data items so that, for example, one user does not change data items being studied by a second user. Locking protocols have been developed to control such user access.

Prior art locking protocols are usually invoked automatically by a file access processor in response to receiving data processing requests from users at support processors. Under normal operating conditions, these locking protocols cannot be expressly manipulated by a user at a support processor, and in fact, such a user may not even be aware of the existence of the locking protocols. Moreover, these prior art locking protocols are normally automatically terminated by the file access processor after the complete processing of a work unit, which is conventionally defined as a group of logically related data processing requests from a particular application support processor. Thus, these prior art locking protocols do not allow the locks, which are placed on data objects during a particular work unit, to be maintained on the data objects after the completion of that particular work unit.

SUMMARY OF THE INVENTION

An object of this invention is to provide a multi-user system for managing a database with a locking protocol that may be explicitly controlled by a user of the system.

Another object of the present invention is to provide a multi-user database system with a locking protocol that may maintain locks on data objects after the system has completed the processing of a work unit on a user's behalf.

A further object of this invention is to provide a multi-user system for managing a database, of the type having a plurality of application support processors, with a locking protocol that allows a user to explicitly lock selected data items for exclusive read and update access by a selected one of the application support processors.

Still another object of the present invention is to provide a multi-user system for managing a database, of the type having a plurality of application support processors, with a locking protocol that allows a user to explicitly lock selected data items for read and update access by a particular application support processors, while allowing the other application support processors to read the selected data items.

These and other objectives are attained with a multi-user system for managing a database having a multitude of data objects. The system comprises a file access processor for accessing the database, and a plurality of application support processors connected to the file access processor to read and update the data objects. Each application support processor includes means to transmit to the file access processor requests to process data objects. The file access processor includes locking means to lock data objects for selected application support processors to limit access to locked data objects by the other application support processors, and this locking means includes implicit locking means and explicit locking means. The implicit locking means places implicit locks on data objects automatically in response to receiving data processing requests from the application support processors, and the explicit locking means places explicit locks on data objects in response to receiving explicit locking requests from the application support processors, and independent of data processing requests from those support processors. At least a first of the application support processors includes means to activate the explicit locking means to lock selected data objects.

Preferably, the explicit locking means is capable of placing data items in different modes, referred to as an explicit exclusive mode, an explicit update mode, and an explicit share mode. When a given application support processor activates the explicit locking means to place a given data item in the explicit exclusive mode, that processor has exclusive read and update to the given data item. All other processors are denied all access to the given data item; and, in effect, the given data item is taken out of the data base for the exclusive use of the given support processor, preferably until the explicit lock is released by a user at the given support processor.

When a given application support processor activates the explicit locking means to place a given data object in the explicit update mode, that support processor has read and update access to the data object. All of the other support processors are prevented from obtaining update access to the given data object, but the other application support processors are allowed to read the given data object. When a given support application processor activates the explicit locking means to lock a data object in the explicit share mode, that application support processor has read access to the data object. All of the other support processors are allowed to read the data object and, in fact, these other support processors may also activate the explicit locking means to place additional explicit share locks on the given data object.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

As previously mentioned, locking protocols or systems are used to control access to data objects when multiple users concurrently access the same data object or group of data objects in a database. One important consideration in designing a locking protocol is the selection of the lockable unit —that is, the aggregate of data objects that are locked. For example, a whole area of data objects could be locked, as well as individual data objects. As a general rule, the broader, or wider, the lockable unit, the lower the concurrency— that is, the fewer the number of users that can share a system at a given time. On the other hand, a particular user may want to lock a large number of data objects, and the narrower, or finer, the lockable unit, the greater the time and expense required to lock a large number of data objects. Generally, for a simple transaction —one that accesses only a few records— a narrow lockable unit is preferred, but for a complex transaction —one that accesses a large number of records— a wide lockable unit is preferred. Because a single data base may be accessed for both simple and complex transactions, it is usually desirable to be able to lock different widths of data aggregates.

Figure 1:
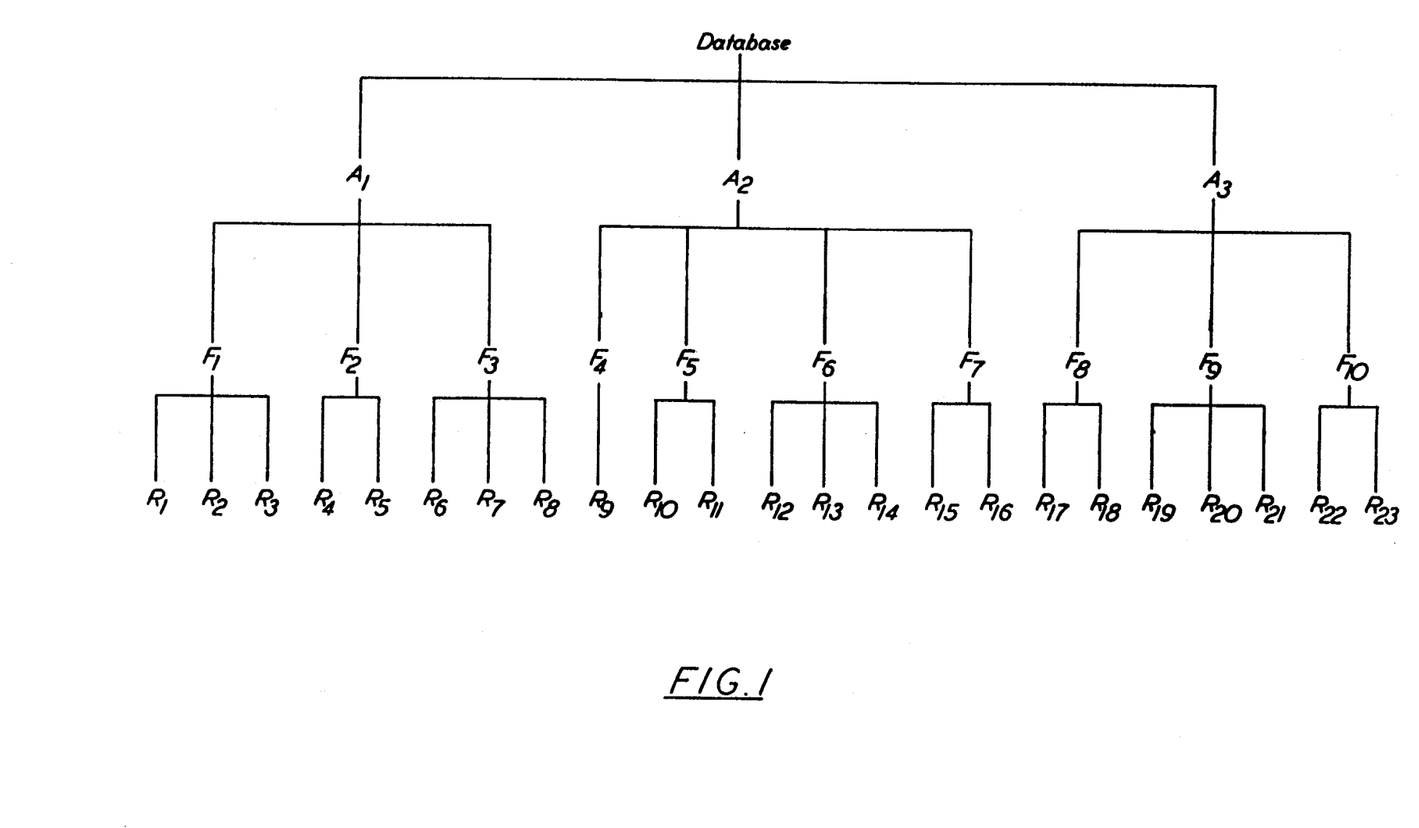
FIG. 1 is a representation of a data base arranged according to a hierarchical order.

Often, the data items of a data base can be considered as being organized in a hierarchy, where the data items of the data base, taken as a whole, form a single class, that class is divided into a plurality of groups, and each of these groups consists of one or more sets of data items. FIG. 1 presents a typical hierarchy structure for a data base; and the data base comprises a number of areas $A_1$-$A_3$, each area includes one or more files $F_1$-$F_{10}$, and each file has one or more data objects or records $R_1$-$R_{23}$. As so described, the data base consists of four levels, with each level consisting of one or more nodes.

Conventionally, the nodes of one level that belong to a particular node of the immediately higher level, are said to be children of the latter node; and the node of one level to which the nodes of an immediately lower level belong, is said to be a parent of the latter nodes. For example, with the example shown in FIG. 1, files $F_1$ and $F_2$ are children of area $A_1$, and files $F_4$, $F_5$ and $F_6$ are children of area $A_2$. File $F_3$ is the parent of records $R_7$ and $R_8$, and area $A_3$ is the parent of file $F_8$. For analogous reasons, records $R_7$ and $R_8$ are said to be descendants of area $A_1$, while records $R_{12}$ and $R_{13}$ are said to be descendants of area $A_2$; and area $A_2$ is said to be an ancestor of records $R_9$ and $R_{10}$, and area $A_1$ is said to be an ancestor of records $R_7$ and $R_8$.

In a typical locking protocol, each node of the hierarchy can be locked in any one of several modes. If a node is locked in an exclusive access mode for a particular application support processor, then that node and all of its descendants can be read or changed by, and only by, that particular support processor. If a node is locked in a shared access mode for a particular application support processor, then that node and all of its descendants can be read by that processor and by all other support processors, but the node and its descendants cannot be changed by any of the support processors. Conventionally, it is often said that if a particular node is locked in an exclusive or shared access mode, all the descendants of that node are automatically locked in that same mode.

With many data processing requests, it is desirable that a user have the option to lock certain data items in either an exclusive access mode or a shared access mode, even though it is not necessary that those data items be currently locked in either of these modes. A locking mode referred to as an intention mode is used with a hierarchical database to lock or tag particular nodes of the database so that descendants of those nodes may subsequently be locked in the exclusive access mode or the shared access mode. More specifically, when a particular node is implicitly placed in an intention mode, in response to receiving a data processing request from one application support processor, all the ancestors of that node are also placed in the intention mode, and this prevents all the descendants of the subject node from being locked for exclusive or shared access by any other application support processor. As a general rule, with reference to FIG. 1, prior to locking particular nodes or data items, intention access is first obtained to the area or file containing that node or data item, and, subsequently, the desired locks are placed on the desired nodes or data items.

Figure 2:
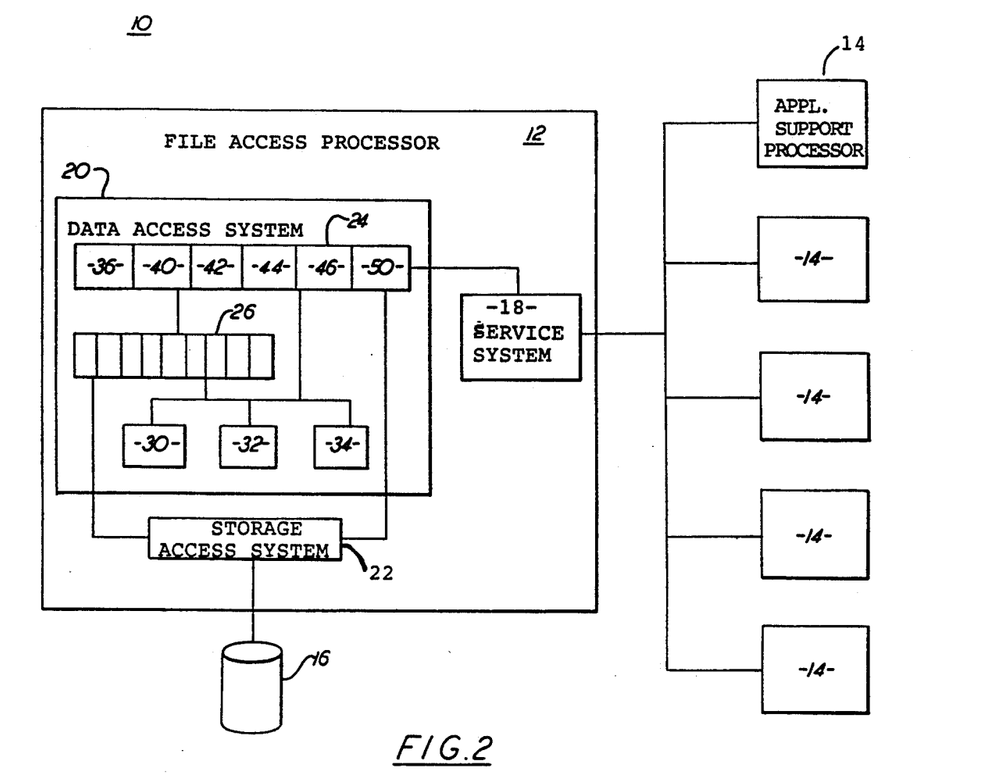
FIG. 2 is a block diagram schematically illustrating a file sharing system according to this invention.

FIG. 2 shows file sharing system 10 employing a locking protocol according to the present invention; and generally the file sharing system comprises file access processor 12 and a plurality of application support processors 14. Processor 12 provides access to a database having a multitude of data objects, and which may be stored on an external storage medium 16, and this processor 12 is provided to process requests from processors 14 relating to those data objects. Support processors 14 are connected to file processor 12 to read and update the data objects in the database, and each support processor includes means to transmit to the file access processor requests to process data objects.

File Access Processor 12 services requests from the set of Application Support Processors 14 which can exist in a global network, with each Application Support Processor sharing access to data in files stored by and managed by one or more File Access Processors 12. Each Application Support Processor 14 also maintains an internal cache of file information to improve performance by reducing communications with the File Access Processor 12 for information about files. File Access Processor 12 manages access to a set of data files and information about files held in file directories. File directories allow for managing file collection, relate to each other hierarchically, and may be shared. The File Access Processor also maintains an internal set of catalogs, which are repositories of internal information in the File Access Processor for its own internal use, and which are not directly available and accessible to Application Support Processors, as are the data files and directories.

The file access processor includes service system 18, data access system 20 and storage access system 22. The functions of these components of the file access processor are generally known in existing computer systems, and are not described herein in detail, but a summary of their functions is given below to establish perspective. The Service System 18 provides environmentally dependent services for the processor 12, including the initial receipt of requests, forwarding requests for file access, and dispatching an activation of the Data Access System 20. The Data Access System 20 processes individual requests, and maintains a set of catalogs that contain control and descriptive information concerning the set of files managed by the File Access Processor 12. The Storage Access System 22 manages the data blocks that comprise the data files, the set of records that comprise the catalogs, the set of locks that permit concurrency, and the grouping of work items that represent recovery units.

The Data Access System has a number of subcomponents including the Session Management Subcomponent 24, the Request Management Subcomponent 26, the Space Management Subcomponent 30, the Catalog Management Subcomponent 32, and the Cache Management Subcomponent 34. The Session Management Subcomponent receives requests through the Service System and it is the focal point of control, and the Session Management includes a set of fundamental services for response formulation. Session Management determines which Request Management Subcomponent routine should be invoked to service a request and passes control to Request Management; and at the end of request processing, Request Management passes control back to the Session Management Subcomponent to finish request processing and to forward the requested response.

The Session Management Subcomponent includes a number of service routines. A start-up routine 36 is used to initialize Data Access System control structures, and a storage Pool routine 40 is used to maintain and dispense working storage for control structures. A response routine 42 is employed to assist Request Management Subcomponent routines build response messages, and to assemble the response and cache update information into a properly formatted response message. A work routine 44 is utilized to coordinate and initiate processing required when a logical group of requests are "committed" or "rolled back", i.e. manage activities at designated points of recovery.

The Work routine invokes the Catalog Management Subcomponent to accomplish catalog updates based upon Work Request Blocks (WRBs) built by Request Management, and the work routine invokes the Space Management Subcomponent to coordinate the update of the Space Catalog. The Work routine also invokes the Storage Access System to commit changes to file blocks and catalogs, and invokes the Cache Management Subcomponent 34 to store cache notification information.

The Session Management Subcomponent further includes a Terminate routine 46 to clean up control structures at the conclusion of an activation of the Data Access System, and a WRB Condense routine 50, which supports reduction of multiple changes to the same catalog entry into a single change. The Data Access System utilizes several catalogs for managing file and directory information, and each entry in the Object Catalog, for example, contains descriptive and control information about a particular file. Work Request Blocks are used to save catalog change information from the time of file request processing until the time that the work unit is committed. When multiple WRBs exist for the same catalog entry, they are condensed into a single WRB.

The Request Management Subcomponent 26 includes routines for each type of request the Data Access System is designed to process. As illustrated is FIG. 2, Request Management includes nine routines, although a typical Request Management subsystem has thirty to forty routines. Request Management utilizes the Catalog Management Subcomponent to access catalogs, uses the Space Management Subcomponent 30 to manage logical space, and employs the Cache Management Subcomponent for cache control processing. In addition, Request Management builds and maintains WRBs, which go the Work routine at commit time —that is, at the successful completion of a work unit —to drive catalog and cache updates. The Request Management Subcomponent 26 utilizes the Storage Access System 22 directly to engage or disengage one or more logical locks that represent commitments against files and catalogs; and Request Management invokes the Storage Access System to add, delete, and update data blocks associated with particular files according to the requirements of the current request.

The Catalog Management Subcomponent assembles the control structures required to invoke the Storage Access System 22 to access the set of catalogs that the Data Access System 20 utilizes for control information for its set of files. The Space Management Subcomponent manages the logical space for an Application Support Processor represented by a FSCB (File Space Control Block), a logical representation of the Space Catalog entry for the Application Support Processor. Requests that affect logical space consumption due to changes in the storage consumed by files accomplish space accounting though the Space Management Subcomponent. The Space Management Subcomponent also uses the Catalog Management Subcomponent 32 to access the Space Catalog.

The Cache Management Subcomponent is invoked by the Work routine of the Session Management Subcomponent at the successful completion of a work unit to update the cached data maintained by the Data Access System 20, using information in WRBs built by the Request Management Subcomponent to establish which directories are to be supported in the cache for the current Application Support Processor.

A locking protocol for system 10 is described in detail below. Other components of file access processor 12 are described in detail in copending U.S. Pat. application No. 110,370 filed herewith; in U. S. Pat. copending application No. 110,463 filed herewith and now issued as U.S. Pat. No. 4,888,681; and in copending U.S. Pat. application No. 110,461 and now issued as U.S. Pat. No. 4,897,782.

All three of the above-identified applications are herein incorporated by reference, and are owned by the assignee of the present application.

Figure 3:
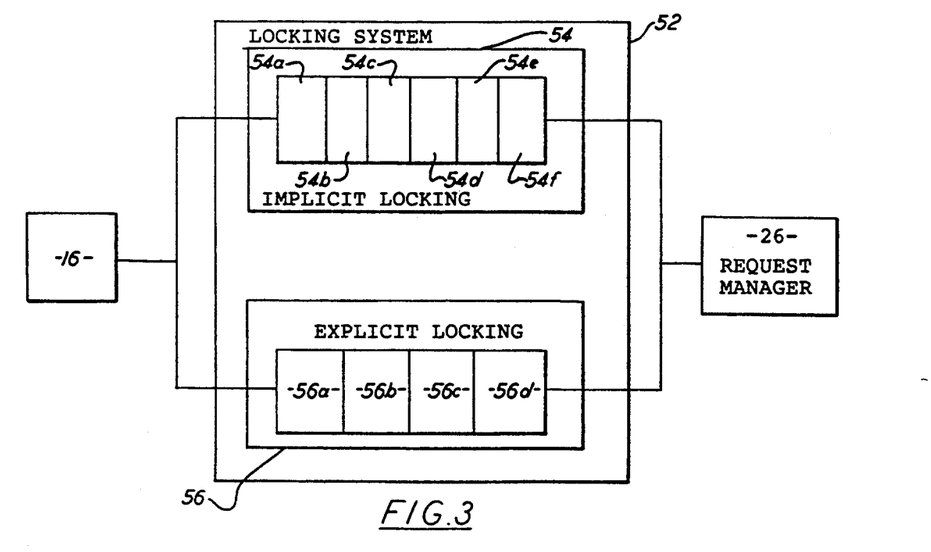
FIG. 3 is a block diagram schematically showing in greater detail, the locking means of the file sharing system.

With particular reference to FIG. 3, the file access processor includes locking system or means 52 to lock data objects for selected application support processors to limit access to locked data objects by all the application support processors other than the selected support processors. Preferably, locking means 52 is a component of storage access system 22, and this locking means includes implicit locking means 54 and explicit locking means 56. Implicit locking means 54 is provided to place implicit locks on data objects automatically in response to receiving data processing requests from the application support processors, and explicit locking means 50 is provided to place explicit locks on data objects in response to receiving explicit locking requests from the application support processors, and independent of data processing requests from the support processors.

Several types of implicit locking modes are commonly used with multi-user systems; and, for example, implicit locking means 54 includes means 54a, b, c, d, e and f to place data objects in an exclusive access mode, a shared access mode, an intention exclusive mode, an intention shared mode, and a shared with intention exclusive mode, respectively. When a data object is implicitly locked in an exclusive access mode in response to a particular request submitted to the data access system by a selected application support processor, that, and only that, application support processor has exclusive read and update access to the data object, and all of the application support processors, other than that one processor, are denied all access to the data object. In a hierarchical database, when a given node is implicitly locked in an exclusive access mode in response to a particular request submitted to the data access system by a selected application support processor, that, and only that, application support processor has exclusive read and update access to that node and to all of its descendants; and all of the application support processors, other than that one processor, are denied all access to the given node and to all of its descendants.

When a data object is implicitly locked in a shared access mode in response to a particular request submitted to the data access system by a selected application support processor, that selected application support processor has read access to the data object, and all of the application support processors, other than that selected one, are prevented from obtaining exclusive access to that data object. In a hierarchical data base, when a given node is locked in a shared access mode in response to a particular request submitted to the data access system by a selected application support processor, that selected application support processor has read access to that node and to all of its descendants; and all of the application support processors, other than that selected one, are prevented from obtaining exclusive access to that node or any of its descendants.

When a data object is implicitly placed in an intention exclusive mode in response to a particular request submitted to the data access system by a selected application support processor, that application support processor has the option of later implicitly activating the locking means to convert the data object to the exclusive access mode; and all of the application support processors, other than that selected one, are prevented from implicitly activating the locking means to lock the data object in the exclusive access or shared access mode. In a hierarchical data base, when a given node is placed in the implicit intention exclusive mode in response to a particular request submitted to the data access system by a selected application support processor, that selected application support processor has the option of later implicitly activating the locking means to place any of the descendants of that node in the exclusive access mode; and all of the application support processors, other than that selected one, are prevented from implicitly activating the locking means to place the given node or any of its descendants in either the exclusive access or the shared access modes.

When a data object is implicitly placed in an intention share mode in response to a particular request submitted to the data access system by a selected application support processor, that selected support processor has the option of later implicitly activating the locking means to convert the data object to the share mode; and all of the application support processors, other than that selected one, are prevented from implicitly activating the locking means to place the data object in the exclusive access mode. In a hierarchical database, when a given node is implicitly placed in an intention share mode in response to a particular request submitted to the data access system by a selected application support processor, that selected application support processor has the option of later implicitly activating the locking means to place any of the descendants of that node in the share mode; and all of the application support processors, other than that selected one, are prevented from implicitly activating the locking means to place the given node or any of its descendants in an implicit exclusive access mode.

When a data object is implicitly placed in a share with intention exclusive mode in response to a particular request submitted to the data access system by a selected application support processor, that selected application support processor has read access to the data object and has the option of later implicitly activating the locking means to place the data object in the exclusive mode; and all of the application support processors, other than the selected one, are prevented from implicitly activating the locking means to place the data object in either the exclusive access or the shared access modes. In a hierarchical data base, when a given node is implicitly placed in the share with intention exclusive mode in response to an activation of the data access system by a selected application support processor, that selected application support processor has read access to that node and to all of its descendants, and this support processor further has the option of later implicitly activating the locking means to place any of the descendants of the given node in the exclusive access mode. At the same time, all of the application support processors, other than the selected one, are prevented from implicitly activating the locking means to place the given node or any of its descendants in either the exclusive access or the shared access modes.

In accordance with the present invention, explicit locking means 56 is provided with means 56a, b and c to place data objects in several additional, explicit locking modes referred to as the explicit exclusive mode, the explicit update mode, and the explicit share mode, respectively. When a given application support processor expressly activates the locking means to lock a given data object in the explicit exclusive mode, that processor, and only that processor, has exclusive read and update access to the data object, preferably until the explicit lock is released by a user at the selected support processor. All of the support processors, other than that selected one, are denied all access to the data object; and, in effect, the given data object is taken out of the database for an indefinite period of time for the exclusive use of the selected support processor.

When a given application support processor expressly activates the locking means to lock a data object in the explicit update mode, that processor has read and update access to the data object preferably until the explicit lock is released by a user at the selected support processor. All of the support processors, other than the selected one, are prevented from obtaining exclusive access to the data object either by the explicit exclusive mode or the implicit exclusive mode, or from obtaining explicit update access to the data object. The other application support processors are allowed, though, to read the data object and to activate the locking means to place the data object in the implicit intention share mode or the share mode.

When a given application support processor expressly activates the locking means to lock a data object in the explicit share mode, that application processor has read access to the data object, preferably until the explicit lock is released by a user at the selected support processor. All of the other application support processors may obtain read access to the data object and, in fact, may also activate the locking means to place additional explicit share locks on the data object. Further, the other application support processors may activate the locking means to place the data object in the intention share mode or the share mode, but not in either the explicit exclusive or explicit update modes.

In a conventional locking protocol, all of the implicit locks placed on data objects during the processing of a given work unit, are automatically terminated when the data access system has completed processing that work unit. In this way, the implicit locks do not affect or interfere with subsequent processing requests from the same, or other, application support processors. The explicit locking means of the present invention includes means 56d to maintain the explicit locks after the completion of processing particular work units; and, preferably, the explicit locks are maintained until they are explicitly released by a user. Thus, a user has the option of maintaining these explicit locks between activations of the data access system and for indefinite periods of time.

As will be understood by those of ordinary skill in the art, the locking protocol disclosed herein can be used in multi-user systems other than file sharing systems; and, for instance, the locking protocol may be employed with a suitable database system accessed by plural users.

Figure 4:
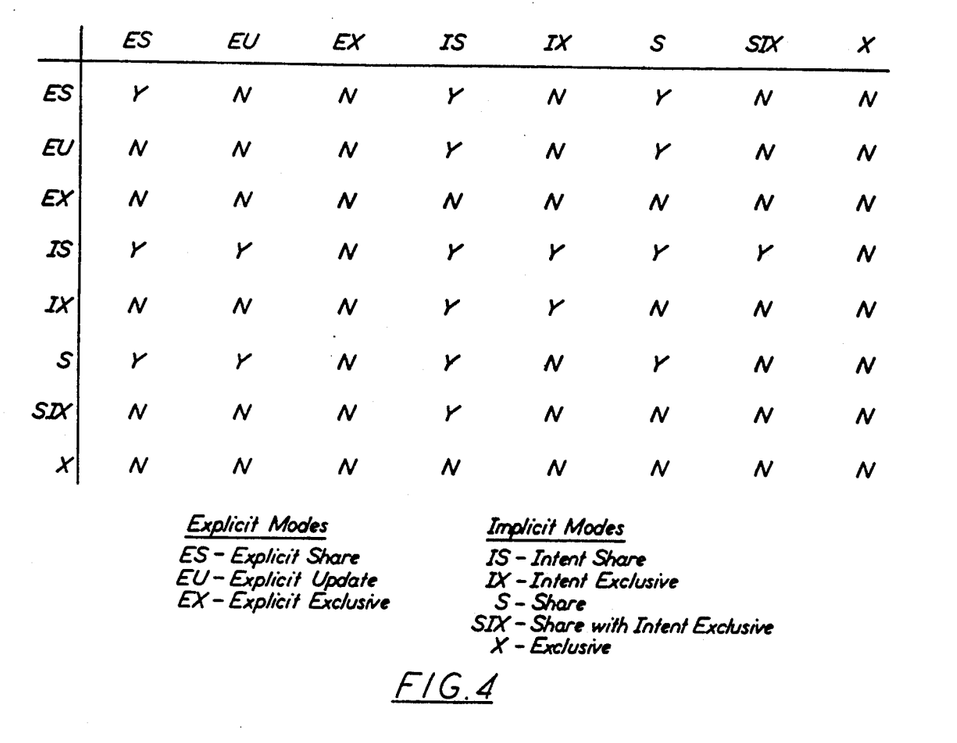
FIG. 4 is a table showing the compatibility of the locking modes that may be implemented by the locking means of the file sharing system.

Different users may each, either implicitly or explicitly, request a lock on the same data object, and FIG. 4 is a table showing the compatibility of the above-described locking modes. The locking modes are listed in columns across the top of the table and in rows across the left side of the table. Two locking modes are compatible if a Y is located at the intersection of the column and row identified by the locking modes, and two locking modes are not compatible if an N is listed at the intersection of the column and row identified by those locking modes. For example, the explicit share mode is compatible with itself, which means that multiple users may each lock a given data item in that mode; however, the explicit update mode is not compatible with itself, which means that two different users may not each concurrently lock a given data item in that mode.

Also, the explicit share mode is compatible with the implicit share mode, which means that one user may be able to lock a given data object in the implicit share mode even though that same data object is currently locked in the explicit share mode, either by the same or another user. The explicit share mode is not compatible with the explicit update mode, however, and this means that a user may not lock a given data object in the explicit update mode if that data object currently is locked in the explicit share mode, either by the same or another user.

FIG. 4 also shows that the explicit exclusive mode is incompatible with all the other modes, that the implicit exclusive mode is incompatible with all of the other modes, and that the implicit share with intention exclusive mode is incompatible with all of the other modes except the intention share mode. The intention share mode is compatible with all of the other modes except the explicit exclusive and implicit exclusive modes; and the implicit share mode is compatible with all of the other modes except the explicit and implicit exclusive modes, the intention share mode, and the share with intention exclusive mode.

Figure 5:
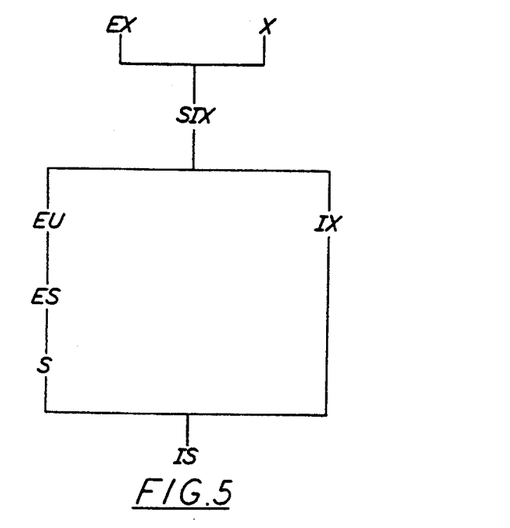
FIG. 5 graphically represents the relative strengths of the locking modes that may be implemented by the locking means.

FIG. 5 is a general representation of the relative strengths of the locking modes based on their compatibility. The explicit exclusive and implicit exclusive modes are considered to be the strongest because neither of these modes is compatible with any of the other modes. The share with intention exclusive mode is the next strongest mode because it is compatible with only one other mode—the intention shared mode. The explicit update mode is considered to be stronger than the explicit share mode, the latter mode is stronger than the implicit share mode, and the implicit share mode is stronger than the intention share mode. The intention exclusive mode is considered to be weaker than the explicit exclusive, the implicit exclusive and the share with intent exclusive modes, but stronger than the intention share mode.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A multi-user system for managing a database having a multitude of data objects arranged in a hierarchy, said system comprising:

a file access processor for accessing the database and managing requests relating to said data objects;

a plurality of application support processors coupled to the file access processor, each of said application support processors including means for transmitting to said file access processor a request to read and/or update a specified first data object and an explicit request for one of a plurality of explicit locks on said first data object pursuant to said read and/or update request, and a request to read and/or update a specified second data object without explicitly requesting an explicit lock on any of said data objects; and wherein said file access processor includes means, responsive to the explicit request for said explicit lock on said first data object, for providing said explicit lock only on said first data object, and means, responsive to the request to read and/or update said second data object without explicitly requesting an explicit lock on any of the data objects, for providing one of a plurality of implicitly locks on said second data object and all other data objects which descend from a same node as said second data object in said hierarchy; and said file access processor includes means, responsive to another request to read or update a specific data object pursuant to an associated explicit lock, for determining if a conflict exists with any previously established explicit or implicit lock; and wherein said plurality of explicit locks comprise an explicit exclusive lock in which the requesting application support processor has exclusive read and update access to said first data object and the other application support processors are denied all access to and all locks on said first data object, an explicit update lock in which a requesting application support processor has read and update access to said first data object and another application support processor can obtain an implicit share lock on said first data object, and an explicit share lock in which a requesting application support processor has read access to said first data object and all of the other application support processors have read access to said first data object but cannot obtain exclusive access to or an explicit update lock, explicit exclusive lock or implicit exclusive lock on said first data object; and said plurality of implicit locks comprise an implicit exclusive lock on said second data object in which the other application support processors are denied all access to and all explicit and implicit locks on said second data object, and an implicit share lock on said second data object in which the other application support processors can obtain an explicit share lock, an explicit update lock and an implicit share lock on said second data object but are denied an explicit exclusive lock and an implicit exclusive lock on said second data object.

2. A system as set forth in claim 1 wherein said plurality of implicit locks also comprise an intent exclusive lock in which the requesting application support processor has the option of later obtaining an implicit exclusive lock in place of the intent exclusive lock on said second data object, and an intent share lock in which the requesting application support processor has the option of later obtaining an implicit share lock in place of the intent share lock on said second data object.

3. A system as set forth in claim 2 wherein the means for determining if a conflict exists determines the conflicts as indicated by the following compatability chart in which a "Y" in any position indicates compatibility between the corresponding locks, and an "N" in any position indicates a conflict between the corresponding locks:

|  | Explicit Share | Explicit Update | Explicit Exclusive | Intent Share | Intent Exclusive | Implicit Share | Implicit Exclusive |
|---|---|---|---|---|---|---|---|
| Explicit Share | Y | N | N | Y | N | Y | N |
| Explicit Update | N | N | N | Y | N | Y | N |
| Explicit Exclusive | N | N | N | N | N | N | N |
| Intent Share | Y | Y | N | Y | Y | Y | N |
| Intent Exclusive | N | N | N | Y | Y | N | N |
| Implicit Share | Y | Y | N | Y | N | Y | N |
| Implicit [Share] Exclusive | N | N | N | N | N | N | N |

4. A system for managing a shared, hierarchical database having a multitude of data objects at a low level in the hierarchy and a plurality of nodes at a higher level in the hierarchy, each of said nodes encompassing a plurality of said data objects, said system comprising:

file access processor means for managing access to the data base; and a plurality of application support processors coupled to the file access processor, each of said application support processors including means for transmitting to said file access processor means a request to read and/or update any one of said data objects, said request specifying said any one of said data objects and explicitly requesting one of a plurality of explicit locks on said any one of said data objects for said request, and a request to read and/or update any one of said data objects without explicitly requesting an explicit lock on any of said data objects; and wherein said file access processor means responds to a first request to update a first one of said data objects encompassed by a first node and an explicit request for one of a plurality of explicit locks on said first data object, by providing said explicit lock on said first data object but not on a second data object encompassed by said first node;

said file access processor means responds to a second request to update said second data object and an explicit request for one of a plurality of explicit locks on said second data object, by providing said explicit lock an said second data object but not on said first data object;

said file access processor means responds to a third request to update a third one of said data objects encompassed by said second node without explicitly requesting an explicit lock on any of said data objects or nodes, by providing one of a plurality of implicit locks on said second node and all data objects encompassed by said second node; and said file access processor means can concurrently provide said locks on said first and second data objects and all data objects encompassed by said second node pursuant to said first, second and third requests, respectively.

5. A system as set forth in claim 4 wherein said file access processor means removes said implicit lock after said third request is satisfied.

6. A system as set forth in claim 5 wherein while said implicit lock exists, said file access processor means responds to a fourth request to update a fourth one of said data objects encompassed by said second node and an explicit request for an exclusive lock on said fourth data object, by determining that said explicit exclusive lock is not compatible with said implicit lock and rejecting said fourth request or holding said fourth request until said implicit lock is removed.

7. A system as set forth in claim 4 wherein said first, second and third requests all request update of the respective data objects.

8. A system for managing a shared, hierarchical database having a multiplicity of data objects at a low level in the hierarchy and a plurality of nodes at a higher level in the hierarchy, each of said nodes encompassing a plurality of said data objects, said system comprising:
   a file access processor for managing access to the data base; and
   a plurality of application support processors coupled to the file access processor, each of said application support processors including means for transmitting to said file access processor a request to read and/or update any one of said data objects, said request specifying said any one of said data objects and explicitly requesting one of a plurality of types of explicit locks on said any one of said data objects for said request, and a request to read and/or update another one of said data objects without explicitly requesting an explicit lock on any of said data objects; and wherein
   said file access processor includes means, responsive to each explicit request for a type of explicit lock on a specific data object, for determining if said explicit lock is compatible with other extant explicit and implicit locks on said specific data object, and if so, providing said explicit lock for said specific data object, said explicit lock being limited to said specific data object; and said file access processor includes means, responsive to a request to read and/or update a specific one of said data objects encompassed by a node without explicitly requesting an explicit lock on any of said data objects or nodes, for determining if a type of implicit lock, corresponding to the type of request, on said node and all data objects encompassed by said node is compatible with other extent explicit and implicit locks on said node or any data objects encompassed by said node, and if so, providing said implicit lock on said node and all data objects encompassed by said node.

9. A system as set forth in claim 8 wherein:
   said file access processor means determines compatibility based on the types of extant locks on a data object sought to be locked pursuant to a current request and the type of lock required for said object pursuant to said current request; and
   said file access processor means can concurrently provide plural compatible locks on a single data object.

10. A multi-user system for managing a database having a multitude of data objects arranged in a hierarchy, said system comprising:
    a file access processor for accessing the database and managing requests relating to said data objects; and
    a plurality of application support processors coupled to the file access processor, each of said application support processors including means for transmitting to said file access processor a request to read and/or update a specified first data object and an explicit request for one of a plurality of explicit locks on said first data object pursuant to said read and/or update request and a request to read and/or update a specified second data object without explicitly requesting an explicit lock on any of said data objects; and wherein
    said file access processor includes means, responsive to the explicit request for said explicit lock on said first data object, for providing said explicit lock only on said first data object, and means, responsive to the request to read and/or update said second data object without explicitly requesting an explicit lock on any of the data objects, for providing one of a plurality of implicit locks on said second data object and all other data objects which descend from a same node as said second data object in said hierarchy.

11. A system as set forth in claim 10 wherein said file access processor includes means, responsive to each request to read or update a specific data object with or without an explicit request for an explicit lock, for determining if a conflict exists with any previously established explicit or implicit lock.

* * * * *